United States Patent
Takahashi et al.

(10) Patent No.: US 10,616,469 B2
(45) Date of Patent: Apr. 7, 2020

(54) IMAGE CAPTURING APPARATUS AND CONTROL METHOD THEREFOR

(71) Applicant: CANON KABUSHIKI KAISHA, Tokyo (JP)

(72) Inventors: Ryotaro Takahashi, Tokyo (JP); Junichi Imamiya, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/451,213

(22) Filed: Jun. 25, 2019

(65) Prior Publication Data

US 2020/0007782 A1  Jan. 2, 2020

(30) Foreign Application Priority Data

Jun. 29, 2018  (JP) .................................. 2018-125295

(51) Int. Cl.
  *H04N 5/232*  (2006.01)
  *H04N 5/225*  (2006.01)

(52) U.S. Cl.
  CPC ..... *H04N 5/232127* (2018.08); *H04N 5/2254* (2013.01); *H04N 5/23296* (2013.01); *H04N 5/232935* (2018.08)

(58) Field of Classification Search
  CPC ....... H04N 5/232127; H04N 5/232935; H04N 5/23296; H04N 5/2254
  See application file for complete search history.

(56) References Cited

U.S. PATENT DOCUMENTS

| 2016/0295120 | A1* | 10/2016 | Ota | H04N 5/23293 |
| 2016/0295122 | A1* | 10/2016 | Ishii | H04N 5/23212 |
| 2017/0223275 | A1* | 8/2017 | Yanagisawa | H04N 5/23212 |
| 2018/0217357 | A1* | 8/2018 | Takahashi | G02B 7/34 |

FOREIGN PATENT DOCUMENTS

JP  2016197180 A  11/2016

* cited by examiner

*Primary Examiner* — Nhan T Tran
(74) *Attorney, Agent, or Firm* — Rossi, Kimms & McDowell LLP

(57) ABSTRACT

In an image capturing apparatus, an image sensor outputs an image converted from light entering through a diaphragm, an acquisition unit acquires an aperture state of the diaphragm, a generator generates a first indicator indicating a focus state of the image, a controller superimposes the image and an indicator indicating a focus state of the image, and displays a resultant image on a display device, a memory stores the indicator displayed on the display device as a second indicator, and a selector selects the first indicator in a case where the aperture state at least at a time of exposure of the image or of generating the first indicator by the generator is changing, and selects the second indicator in a case where the aperture state at these times is not changing. The controller displays the selected indicator.

12 Claims, 9 Drawing Sheets

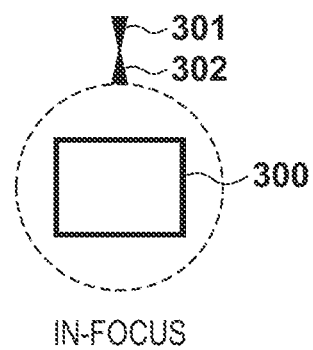
FIG. 3A  IN-FOCUS
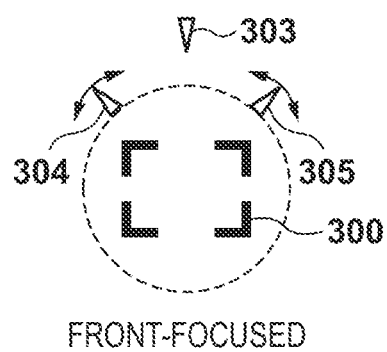
FIG. 3B  FRONT-FOCUSED
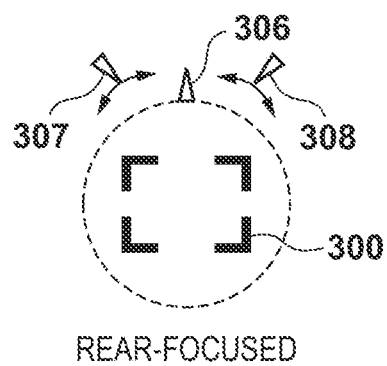
FIG. 3C  REAR-FOCUSED
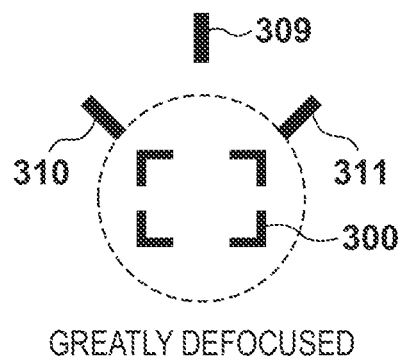
FIG. 3D  GREATLY DEFOCUSED

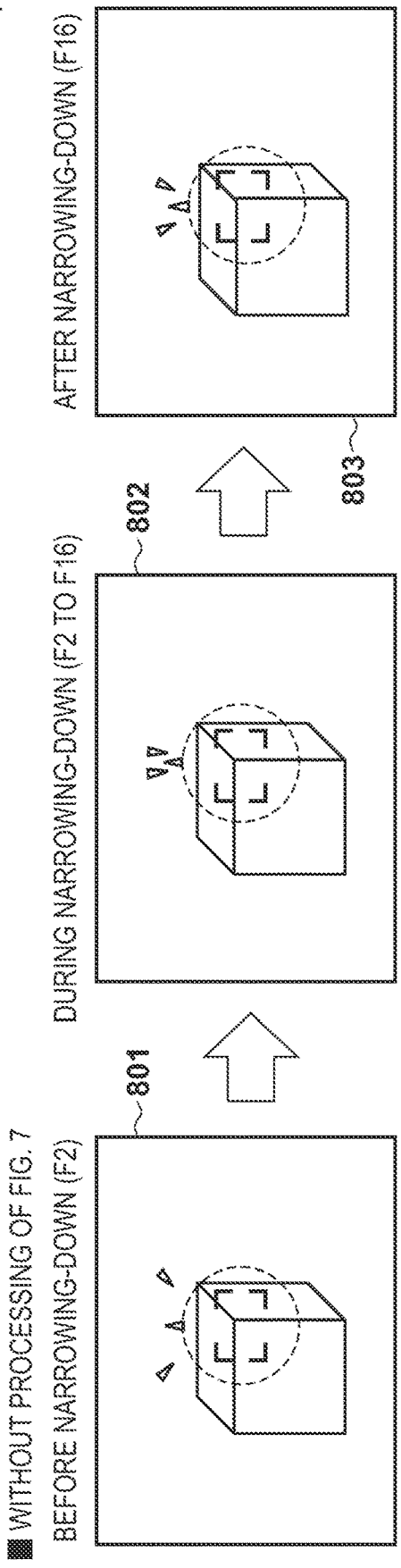
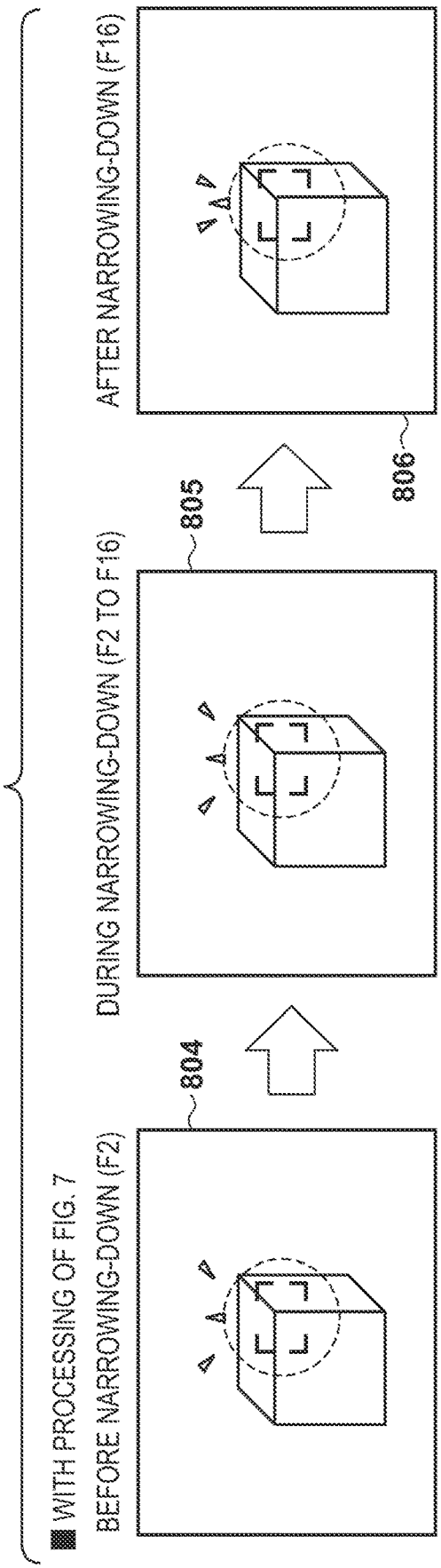

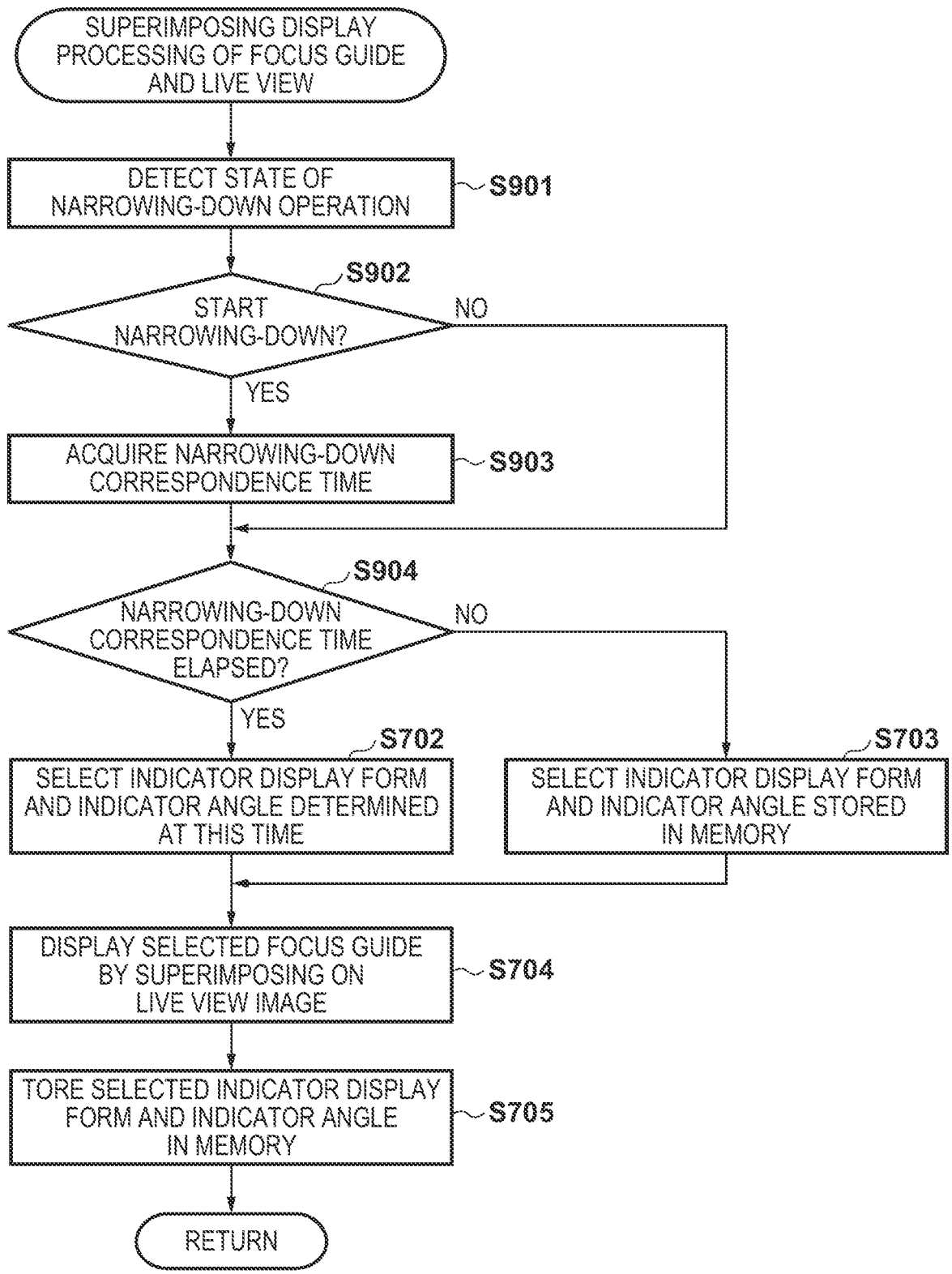

IMAGE CAPTURING APPARATUS AND CONTROL METHOD THEREFOR

BACKGROUND OF THE INVENTION

Field of the Invention

The present invention relates to an image capturing apparatus and a control method therefor, and more particularly to a technique for displaying a focus state of an image capturing apparatus.

Description of the Related Art

Conventionally, it has been proposed to calculate a focus state of a subject using a distance measuring sensor or a plurality of image sensors, and display a front/rear-focused state or a defocus state of the subject based on the calculated focus state. Such a display function is called a focus guide function.

Japanese Patent Laid-Open No. 2016-197180 proposes to display a live view image and superimpose on the live view image a display item indicating a degree of focus state at a position where a subject on which focus is to be adjusted.

However, in Japanese Patent Laid-Open No. 2016-197180, it is disclosed that the display form of a guide image is changed based on a front/rear focused-state or a defocus state of the subject on which focus is to be adjusted, but there is no mention regarding the stability of the display form in a transition state in which an aperture value changes.

SUMMARY OF THE INVENTION

The present invention has been made in consideration of the above situation, and improves the stability of a display state of a guide image in a transition state in which an aperture value changes.

According to the present invention, provided is an image capturing apparatus comprising: an image sensor that periodically outputs an image obtained by converting light entering through a diaphragm into an image signal; and one or more processors and/or circuitry which functions as: an acquisition unit that periodically acquires an aperture state of the diaphragm; a generator that generates a first indicator indicating a focus state of the image based on a value obtained by normalizing the focus state of the image based on the aperture state of the diaphragm at a time of exposure of the image; a controller that superimposes the image and an indicator indicating a focus state of the image, and displays a resultant image on a display device; a memory that stores the indicator displayed on the display device as a second indicator; and a selector that selects the first indicator in a case where the aperture state of the diaphragm at least at the time of exposure of the image or at a time of generating the first indicator by the generator is changing, and selects the second indicator in a case where the aperture state at these times is not changing, wherein the controller displays the indicator selected by the selector.

Further, according to the present invention, provided is a control method of an image capturing apparatus comprising: an image sensor periodically outputting an image obtained by converting light entering through a diaphragm into an image signal; periodically acquiring an aperture state of the diaphragm; generating a first indicator indicating a focus state of the image based on a value obtained by normalizing the focus state of the image based on the aperture state of the diaphragm at a time of exposure of the image; superimposing the image and an indicator indicating a focus state of the image, and displaying a resultant image on a display device; storing the indicator displayed on the display device as a second indicator in a memory; and selecting the first indicator in a case where the aperture state of the diaphragm at least at the time of exposure of the image or at a time of generating the first indicator is changing, and selects the second indicator in a case where the aperture state at these times is not changing, wherein the selected indicator is displayed on the display device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 3A to 3D are diagrams showing examples of focus guide display according to the embodiment;

FIGS. 8A and 8B illustrate the effects of the present invention in a case of narrowing down an aperture; and FIG. 9 is a flowchart showing superimposing display processing of a focus guide and a live view according to a second embodiment.

DESCRIPTION OF THE EMBODIMENTS

Exemplary embodiments of the present invention will be described in detail in accordance with the accompanying drawings.

Configuration of Image Capturing System

Figure 1:
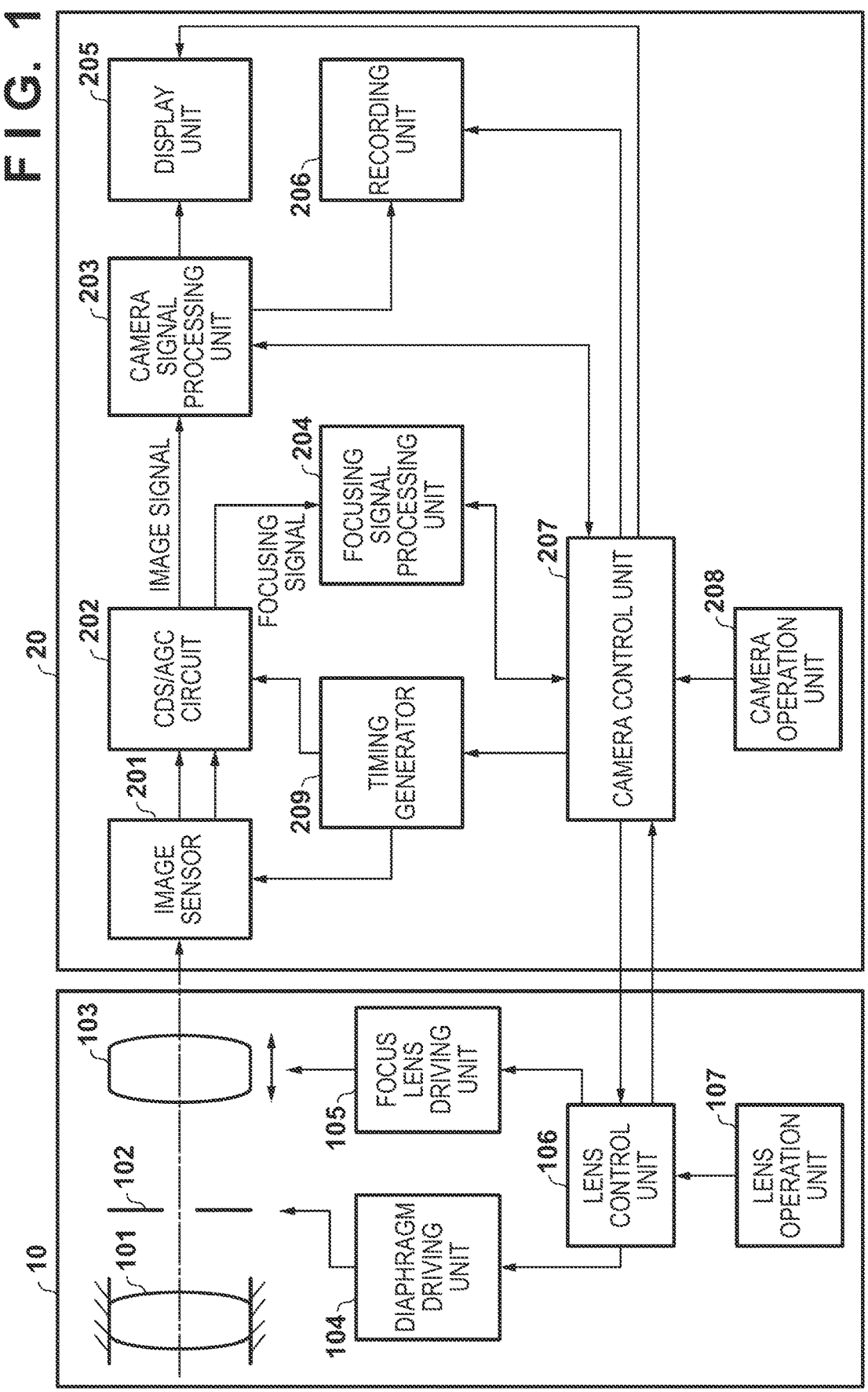
FIG. 1 is a block diagram showing a schematic configuration of an image capturing system according to an embodiment of the present invention.

FIG. 1 is a block diagram showing a schematic configuration of an image capturing system having a focus guide function according to an embodiment of the present invention. In this embodiment, the image capturing system is explained as a lens exchangeable image capturing system as an example, however, an image capturing apparatus with a fixed lens may be used instead.

As shown in FIG. 1, the image capturing system in the present embodiment is basically configured of a lens unit 10 and a camera body 20. A lens control unit 106 that controls the overall operation of the lens unit 10 and a camera control unit 207 that controls the overall operation of the image capturing system communicate data.

First, the configuration of the lens unit 10 will be described. The lens unit 10 has an imaging optical system including a fixed lens 101, a diaphragm 102, a focus lens 103, a zoom lens (not shown), and the like. The diaphragm 102 is driven by a diaphragm driving unit 104, and controls an amount of light incident on an image sensor 201 which will be described later. The focus lens 103 is driven by a focus lens driving unit 105 and used for focusing. The zoom lens (not shown) is used for zoom adjustment by being driven by a zoom lens driving unit. In the present embodiment, the zoom lens and the zoom lens driving unit are not essential components, and may be omitted.

The diaphragm driving unit 104, the focus lens driving unit 105, and the zoom lens driving unit are controlled by the lens control unit 106, and an aperture diameter of the diaphragm 102 and positions of the focus lens 103 and the zoom lens are controlled. When an operation such as focusing or zooming is performed by the user operating a focus ring or a zoom ring provided in a lens operation unit 107, the lens control unit 106 performs control according to the user operation. The lens control unit 106 controls the diaphragm driving unit 104, the focus lens driving unit 105, and the zoom lens driving unit in accordance with a control command and control information, described later, received from the camera control unit 207, and also sends lens information to the camera control unit 207.

Next, the configuration of the camera body 20 having a focus guide function according to the present embodiment will be described. In the camera body 20, the image sensor 201 is formed of a CCD, a CMOS sensor, or the like, and light entering through the imaging optical system of the lens unit 10 is incident on the light receiving surface of the image sensor 201. Then, a formed subject image is photoelectrically converted by photodiodes (photoelectric conversion units) of the image sensor 201 into charges corresponding to the amounts of incident light, and are accumulated. The charge stored in each photodiode is sequentially read out from the image sensor 201 as a voltage signal corresponding to the charge based on the drive pulse supplied from a timing generator 209 in accordance with the instruction from the camera control unit 207. Although the detailed configuration of the image sensor 201 will be described later, the image sensor 201 in the present embodiment is able to output a pair of focusing signals that can be used for phase difference focus detection in addition to a normal image signal.

The imaging signal and the focusing signals read out from the image sensor 201 are input to a CDS/AGC circuit 202, and undergo correlated double sampling to remove reset noise, gain adjustment, and digitization of the signals. The CDS/AGC circuit 202 outputs the processed image signal to a camera signal processing unit 203 and the focusing signals to a focusing signal processing unit 204.

The camera signal processing unit 203 performs various types of image processing on the image signal output from the CDS/AGC circuit 202 to generate a video signal. In addition, the camera signal processing unit 203 performs photometry using the image signal, and determines the shutter speed, aperture value, and sensitivity so as to obtain optimum brightness. A display unit 205 is a display device such as an LCD or an organic EL, and displays an image based on the video signal output from the camera signal processing unit 203. Further, in the recording mode for recording the image signal, the image signal is sent from the camera signal processing unit 203 to a recording unit 206 and recorded on a recording medium such as an optical disk, a semiconductor memory, a magnetic tape, or the like.

The focusing signal processing unit 204 performs a correlation operation based on a pair of focusing signals output from the CDS/AGC circuit 202 to detect a focus state. Here, a correlation amount, an image shift amount, a defocus amount, and reliability information (two-image coincidence, two-image steepness, contrast information, saturation information, defect information, etc.) are calculated. The image shift amount is converted to the defocus amount using a conversion coefficient K. Then, the calculated defocus amount and reliability information are output to the camera control unit 207. Also, the camera control unit 207 notifies the focusing signal processing unit 204 of a change in settings for calculating the defocus amount and reliability information based on the acquired defocus amount and reliability information.

The camera control unit 207 exchanges information with each component in the camera body 20 to perform control. In addition to the processing in the camera body 20, the camera control unit 207 controls ON/OFF of the power, setting change, and recording according to an input from a camera operation unit 208 operated by the user. Furthermore, the camera control unit 207 performs various functions according to user operation such as switching of auto focus (AF)/manual focus (MF) control, control of narrowing down based on the aperture value obtained by the camera signal processing unit 203, and confirmation of recorded video. Further, as described above, the camera control unit 207 exchanges information with the lens control unit 106 of the lens unit 10 to transmit a control command or control information of the imaging optical system, and acquire information of the lens unit 10.

Configuration of Image Sensor

Figure 2:
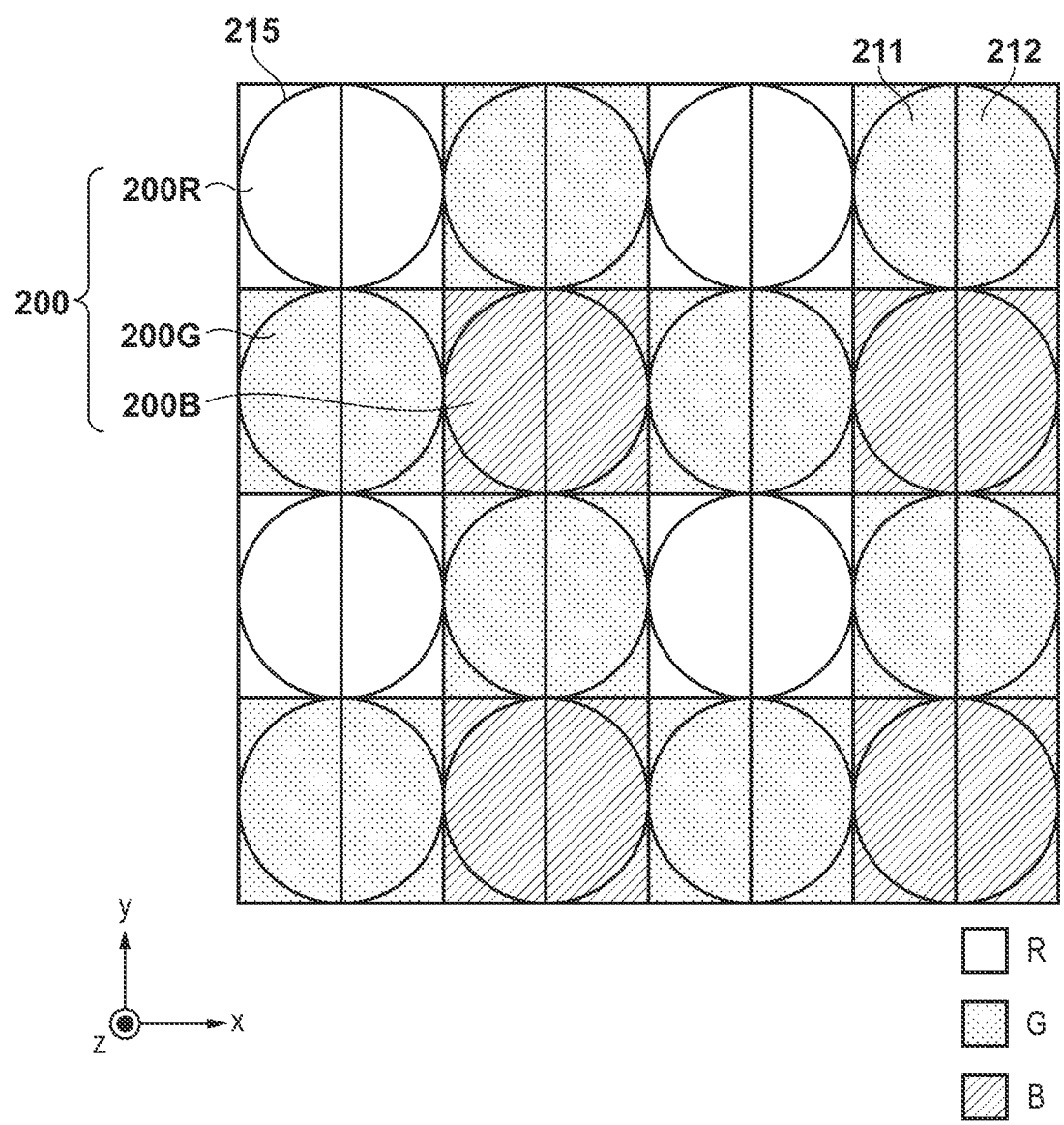
FIG. 2 is a schematic view of a pixel array of an image sensor according to the embodiment.

FIG. 2 is a diagram schematically showing the pixel array of the image sensor 201 in this embodiment, and 4 columns×4 rows of imaging pixels (8 columns×4 rows of focus detection pixels) of the pixel array of the two-dimensional CMOS sensor used as the image sensor 201 are shown.

In the present embodiment, it is assumed that a pixel group 200 consists of 2 columns×2 rows of pixels and is covered by a Bayer-arranged color filter. In each pixel group 200, a pixel 200R having R (red) spectral sensitivity is arranged at the upper left position, pixels 200G having G (green) spectral sensitivity are arranged at the upper right and lower left positions, and a pixel 200B having B (blue) spectral sensitivity is arranged at the lower right position. Furthermore, in the image sensor 201 of the present embodiment, each pixel holds a plurality of photodiodes (photoelectric conversion units) with respect to one microlens 215 in order to perform on-imaging plane phase difference focus detection. In this embodiment, it is assumed that each pixel is constituted by two photodiodes 211 and 212 arranged in 2 columns×1 row.

The image sensor 201 can acquire image signals and focusing signals by arranging a large number of pixel groups 200 consisting of 2 columns×2 rows of pixels (4 columns×2 rows of photodiodes) shown in FIG. 2 on its imaging plane.

In each pixel having such a configuration, light fluxes which have passed through different pupil regions are separated by the microlens 215 and enter the photodiodes 211 and 212. Then, the signal (A+B signal) obtained by adding the signals from the two photodiodes 211 and 212 is used as an image signal, and the two signals (A signal and B signal) read out from the individual photodiodes 211 and 212 are used as focusing signals. Note that although the image signal and the focusing signals may be read out respectively, the following readout control may be performed in consideration of the processing load. That is, by reading out the image signal (A+B signal) and the focusing signal (for example, A signal) of one of the photodiodes 211 and 212 and taking the difference between the image signal and the focusing signal, the other focusing signal (for example, B signal) having parallax is obtained.

In the present embodiment, each pixel has two photodiodes 211 and 212 which correspond to one microlens 215, however, the number of photodiodes is not limited to two, and may be more than two. Also, the pupil division direction is not limited to the horizontal direction, and may be the vertical direction. Further, a plurality of pixels having different opening positions of the light receiving portions with respect to the microlenses 215 may be provided. That is, any configuration may be used as long as two signals for phase difference detection, such as A signal and B signal, can be obtained as a result. Further, the present invention is not limited to the configuration in which all the pixels have a plurality of photodiodes as shown in FIG. 2, but the focus detection pixels as shown in FIG. 2 may be discretely provided among normal pixels that constitute the image sensor 201. In addition, a plurality of types of pixels divided by different division methods may be included in the same image sensor.

Display Form of Focus Guide

Next, the display form of the focus guide in the present embodiment will be described with reference to FIGS. 3A to 3D. In the present embodiment, the number of types of the focus guide display is four, namely the first to fourth display forms, and display parts 301 to 311 express a detected focus state. The display parts 301 to 311 are arranged at the top of a focus frame 300.

FIG. 3A shows an example of the first display form showing that it is determined that the subject is in focus. In a state in which the in-focus state is determined, the positions of the inward display part 301 and the outward display part 302 match (here, stop at the top). In addition, in a case where the in-focus state is determined, for example, the display part 301 and the display part 302 may be represented by a color (for example, green) different from a color (for example, white) used in the other display forms.

FIGS. 3B and 3C show examples of the second display form and the third display form, respectively, which indicate the direction to the in-focus position and the magnitude of defocus amount in a case where a subject is not in focus, but the reliability of the focus detection result is high. FIG. 3B shows a case where focus is on the near side of a subject (front-focused), and the inward display part 303 is stopped at the top while the outward display parts 304 and 305 symmetrically move along a circumference (arc) with respect to the inward display part 303. The positions of the display part 304 and the display part 305 indicate the magnitude of the defocus amount, and the distances from the display part 303 (reference position) to the display parts 304 and 305 become larger as the defocus amount becomes larger. Note that the display part 303 corresponds to the display part 301, and the state in which the display part 304 and the display part 305 overlap corresponds to the display part 302.

FIG. 3C shows a case where focus is on the infinite side of a subject (rear-focused), and the inward display parts 307 and 308 symmetrically move along a circumference (arc) with respect to the outward display part 306 while the outward display part 306 is stopped at the top. The positions of the display part 307 and the display part 308 indicate the magnitude of the defocus amount, and the distance from the display part 306 (reference position) to the display parts 307 and 308 become larger as the defocus amount becomes larger. Note that the display part 306 corresponds to the display part 302, and the state in which the display part 307 and the display part 308 overlap corresponds to the display part 301.

As described above, in the second display form and the third display form, the magnitude of the defocus amount can be shown by the positions of the moving display parts (that is, the angle or distance between the display parts). Further, the direction (defocus direction) to the in-focus position can be indicated by the direction of the display part stopped at the top.

In the focus guide in the present embodiment, the defocus amount calculated by the focusing signal processing unit 204 and the camera control unit 207 is first normalized using the permissible circle of confusion Fδ that is based on the aperture value. Then, the normalized defocus amount using the permissible circle of confusion Fδ is converted to an angle (hereinafter referred to as "indicator angle") indicating the degree of focus in the focus guide, and the display parts are moved to form the indicator angle.

FIG. 3D shows an example of the fourth display form in which the reliability of the focus detection result is low. In this case, both of the magnitude of the defocus amount and the defocus direction are not shown so that the user can visually recognize that focus detection cannot be performed. Here, the display parts 309 to 311 are displayed in a color (for example, gray) different from colors in the other display forms, and the display parts 309 to 311 are fixed at predetermined positions. In addition, the shapes of the display parts 309 to 311 are made different from those in the other display forms.

It should be noted that the display forms of the focus guide shown in FIGS. 3A to 3D are examples, and the present invention is not limited to these display forms. For example, in the example illustrated in FIGS. 3A to 3D, the case where the display parts moves along an arc has been described, however, display may be performed so that the display parts move linearly. In that case, the distance between the display parts may be determined and displayed instead of the indicator angle. Further, in the examples shown in FIGS. 3A to 3D, the defocus amount is expressed using two display parts, but the defocus amount may be expressed by moving one display part away from or closer to the reference position indicating the in-focus position. Besides, various display forms are conceivable, and the present invention is not limited by the display forms.

Focus Guide Display Processing

Figure 4:
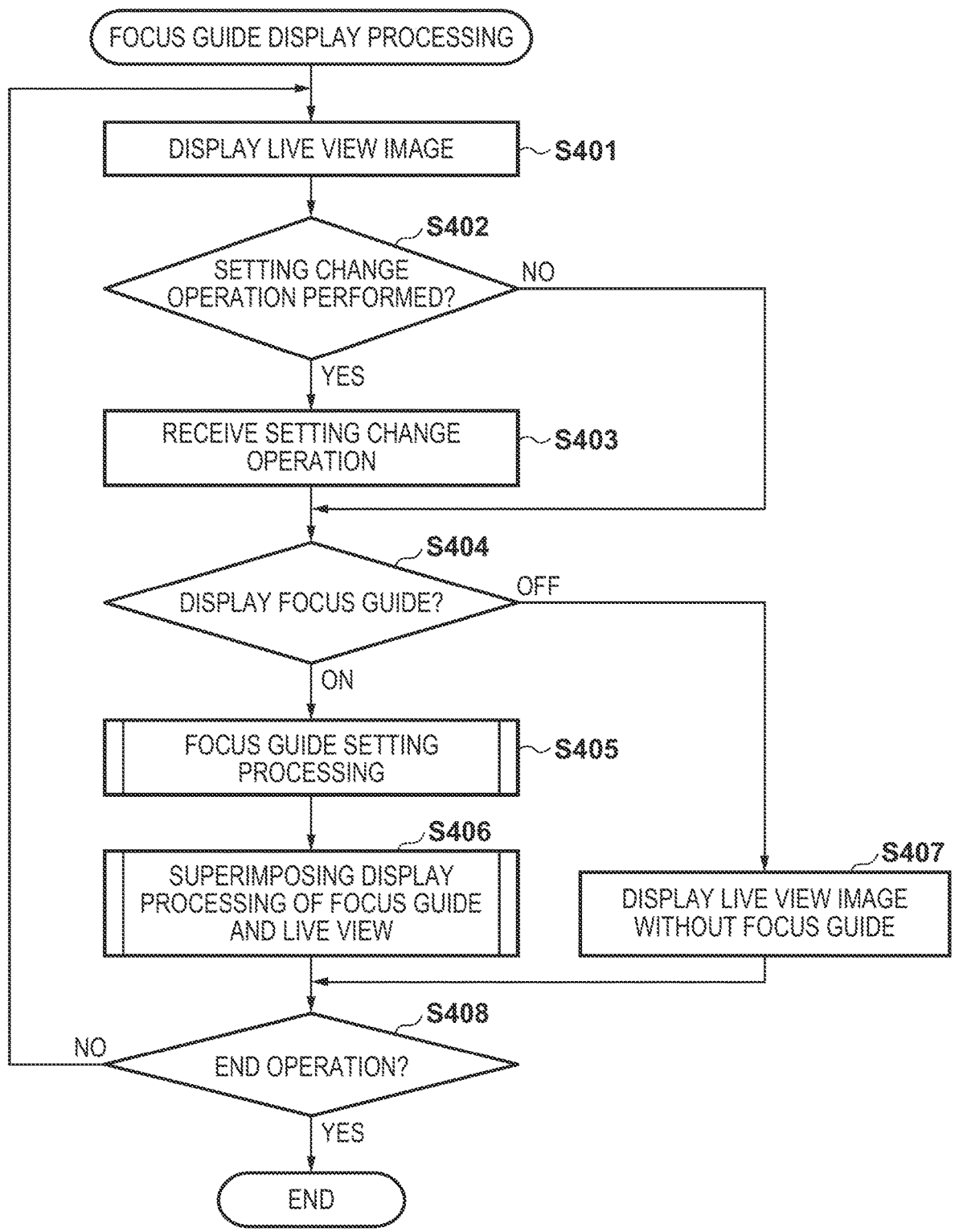
FIG. 4 is a flowchart of focus guide display processing according to the embodiment.

Next, focus guide display processing performed by the camera control unit 207 will be described. FIG. 4 is a flowchart showing focus guide display processing in the present embodiment, which is executed when a shooting mode is selected. First, in step S401, a live view function is activated, an image signal is read out from the image sensor 201, an aperture value is obtained from the lens unit 10 as described later, and the live view image is displayed on the display unit 205. The aperture value obtained here is the aperture value for the next frame for which exposure will be started, and is stored in a memory (not shown) of the camera control unit 207. In step S402, it is determined whether a setting change operation has been performed. If the setting change operation has been performed, the process proceeds to step S403. If the operation has not been performed, the process proceeds to step S404.

In step S403, the menu screen is opened to perform processing for receiving a setting change operation. Here, the setting change of ON/OFF of the focus guide display is accepted. When the reception of the setting change operation is completed, the processing proceeds to step S404, and the setting of the focus guide display is confirmed. If the focus guide display is ON, the process advances to step S405. If the focus guide display is OFF, the process advances to step S407. In step S405, focus guide setting processing is performed. The details of this processing will be described later with reference to FIG. 5. In step S406, the focus guide set in step S405 is displayed by superimposing on the live view image. The details of this processing will be described later in detail with reference to FIG. 7 or 9. On the other hand, in step S407, display is performed without superimposing the focus guide on the live view image.

In step S408, it is determined whether or not the live view display end operation has been performed. If the end operation has been performed, the screen display of the live view image is ended. If not, the process returns to step S402 and displaying of the live view image is continued.

Focus Guide Setting Processing

Next, the focus guide setting process performed in step S405 in FIG. 4 will be described with reference to the flowchart of FIG. 5. This processing is executed by the camera control unit 207.

First, in step S501, information of the focusing area held in a memory (not shown) included in the camera control unit 207 is read out, and notified to the focusing signal processing unit 204. The focusing area may be, for example, an area corresponding to a subject detected by subject detection from the image signal obtained from the image sensor 201, or a predetermined area, or an area set by the user. In step S502, for the subject present in the focusing area obtained in step S501, focus state information indicating a focus state and information on the success or failure of focus detection are acquired from the focusing signal processing unit 204. The focus state information includes information as to whether the focus state is in-focus state, front-focused state or rear-focused state, and a defocus amount in the case of the front-focused state or the rear-focused state. In step S503, based on the information obtained in steps S501 and S502, the display position and the display color of the frame indicating the focusing area to be displayed on the display unit 205 are determined.

In step S504, it is determined whether the focus detection has succeeded or failed from the information obtained in step S502. If succeeded, the process proceeds to step S505, and if not, the process proceeds to step S510. In step S505, it is determined based on the information obtained in step S502 whether the subject is in focus or out of focus. If in focus, the process proceeds to step S507, and if not, the process proceeds to step S506. In step S506, it is determined whether the subject is in the front-focused state or in the rear-focused state based on the information obtained in step S502. If in the front-focused state, the process proceeds to step S508, and if in the rear-focused state, the process proceeds to step S509.

In step S507, the first display form, that is, the indicator display form when the subject is in focus is selected. A display example of the index and the frame in this case is as shown in FIG. 3A. In step S508, the second display form, that is, the indicator display form when the subject is in the front-focused state, is selected. A display example of the index and the frame in this case is as shown in FIG. 3B. In step S509, the third display form, that is, the indicator display form when the subject is in the rear-focused state, is selected. A display example of the index and the frame is as shown in FIG. 3C. In step S510, the fourth display form, that is, the indicator display form when the subject is in a greatly defocused state is selected. A display example of the index and the frame is as shown in FIG. 3D.

When one of the first to fourth display forms is selected in step S507 to S510, the process returns to the processing of FIG. 4.

First Embodiment

Next, referring to FIGS. 6A and 6B, the timings at which exposure, readout, defocus amount calculation, and focus guide display processing are performed in the case of narrowing down the diaphragm 102 and an aperture value at each timing according to a first embodiment will be described. The diaphragm 102 can be changed by operating a narrowing-down button provided on the lens operation unit 107 or the camera operation unit 208, or by directly specifying an aperture value on the UI, for example. Alternatively, the aperture value may be automatically changed based on the photometric result by the camera signal processing unit 203. Here, the narrowing-down button is a button for confirming in advance the degree of blurring of the background of an image that will be actually obtained at the time of recording of the image signal. Usually, focusing during live view display is performed with the aperture fully opened, and therefore the aperture value may be different from the aperture value at the time of recording the image signal. Under this situation, when the user presses the narrowing-down button, the diaphragm 102 is narrowed down to the set aperture value, and it is possible to confirm the change in the degree of blurring of the image due to the change in the depth of field. While the narrowing-down button is pressed, the aperture value of the diaphragm 102 becomes the aperture value at the time of recording the image signal, and when the narrowing-down button is released, the aperture returns to the fully open state. In the example shown in FIGS. 6A and 6B, a case will be explained in which, when the frame 4 is exposed, an instruction to change the aperture value from F2 to F16 is issued from the camera body 20 to the lens unit 10, and the aperture changes during the exposure periods of the frames 4 to 6.

Figure 6:
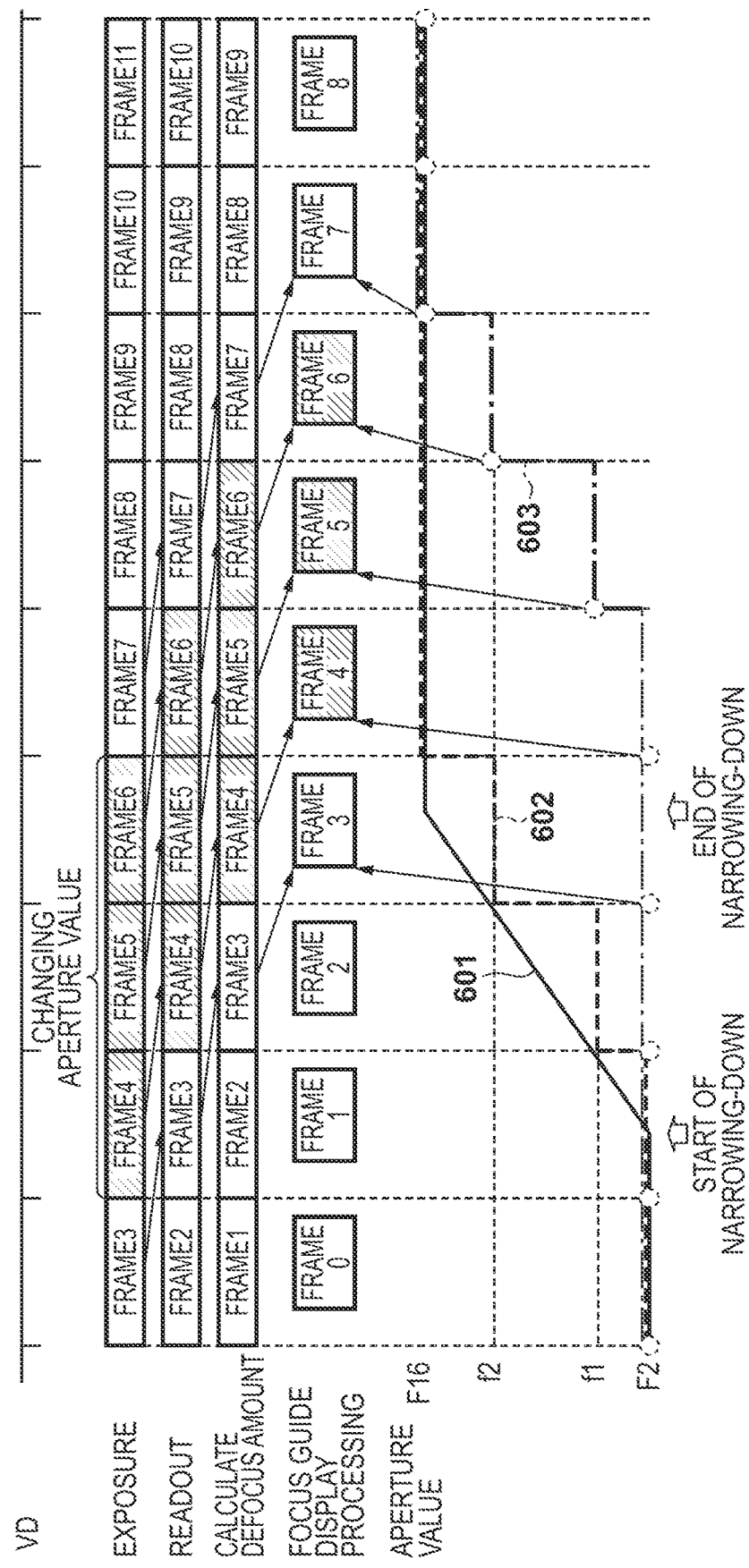
FIGS. 6A and 6B are diagrams showing timings at which exposure, readout, defocus amount calculation, and focus guide display processing are performed in a case of narrowing down an aperture, and aperture values at the respective timings according to a first embodiment.

In the example shown in FIG. 6A, each of exposure, readout, defocus amount calculation, and focus guide display processing is performed in synchronization with a vertical synchronization signal VD. That is, any frame exposed in synchronization with the vertical synchronization signal VD is read out in synchronization with the next vertical synchronization signal VD. Then, the defocus amount calculation is performed on the read frame in synchronization with the next vertical synchronization signal VD to acquire a defocus amount (focus state), and further in synchronization with the next vertical synchronization signal VD, the focus guide display processing is performed based on the obtained defocus amount. In this case, there is a time gap of three vertical synchronization periods after the exposure until focus guide display processing is performed.

Further, in FIG. 6A, a solid line 601 represents a mechanical stop value, and shows the actual aperture state of the diaphragm 102 which is changed by the diaphragm driving unit 104. A broken line 602 is an aperture value on the lens communication, and shows the actual aperture state of the diaphragm 102 at the start of each frame. The aperture value 602 is notified from the lens unit 10 to the camera body 20 in synchronization with the vertical synchronization signal VD, and is an aperture value stored in the memory of the camera control unit 207 in step S401. In the first embodiment, the control value of the diaphragm driving unit 104 is acquired as the aperture value 602. Furthermore, although it is explained that the aperture value is periodically notified in synchronization with the vertical synchronization signal here, the notification timing is not limited thereto, and may be performed, for example, in response to a request from the camera control unit 207. However, control should be performed so that the aperture value 602 is notified at least once in each vertical synchronization period. A dot-dash line 603 indicates an aperture value used during focus guide display processing, and the aperture value 602 on the lens communication is propagated from "exposure" to "focus guide display processing" together with frame data. In other words, the aperture value 602 in lens communication obtained at the start of exposure of an arbitrary frame becomes the aperture value 603 used when performing focus guide display processing based on the frame after three vertical synchronization periods.

As can be seen from FIG. 6A, during the exposure periods of frames 4 to 6, the aperture value 601 on the mechanical mechanism continues to change, so the aperture value 601 does not coincide with the aperture value 602 on the lens communication except for the notification timing of the aperture value 602 in each frame. Therefore, if a defocus amount is normalized based on the permissible circle of confusion Fδ of the aperture value 603 obtained by delaying the aperture value 602, the indicator angle becomes inaccurate. Further, since the conversion coefficient by which the image shift amount detected based on the correlation amount is multiplied is also dependent on the aperture value, the defocus amount itself calculated based on the aperture value 603 also becomes inaccurate. From the above, in the transition state in which the aperture value fluctuates, the indicator angle of the focus guide becomes inaccurate, and the display of the focus guide becomes unstable.

Therefore, in the present embodiment, the display processing of the focus guide is performed as follows to suppress the indicator angle of the focus guide from becoming unstable.

Figure 7:
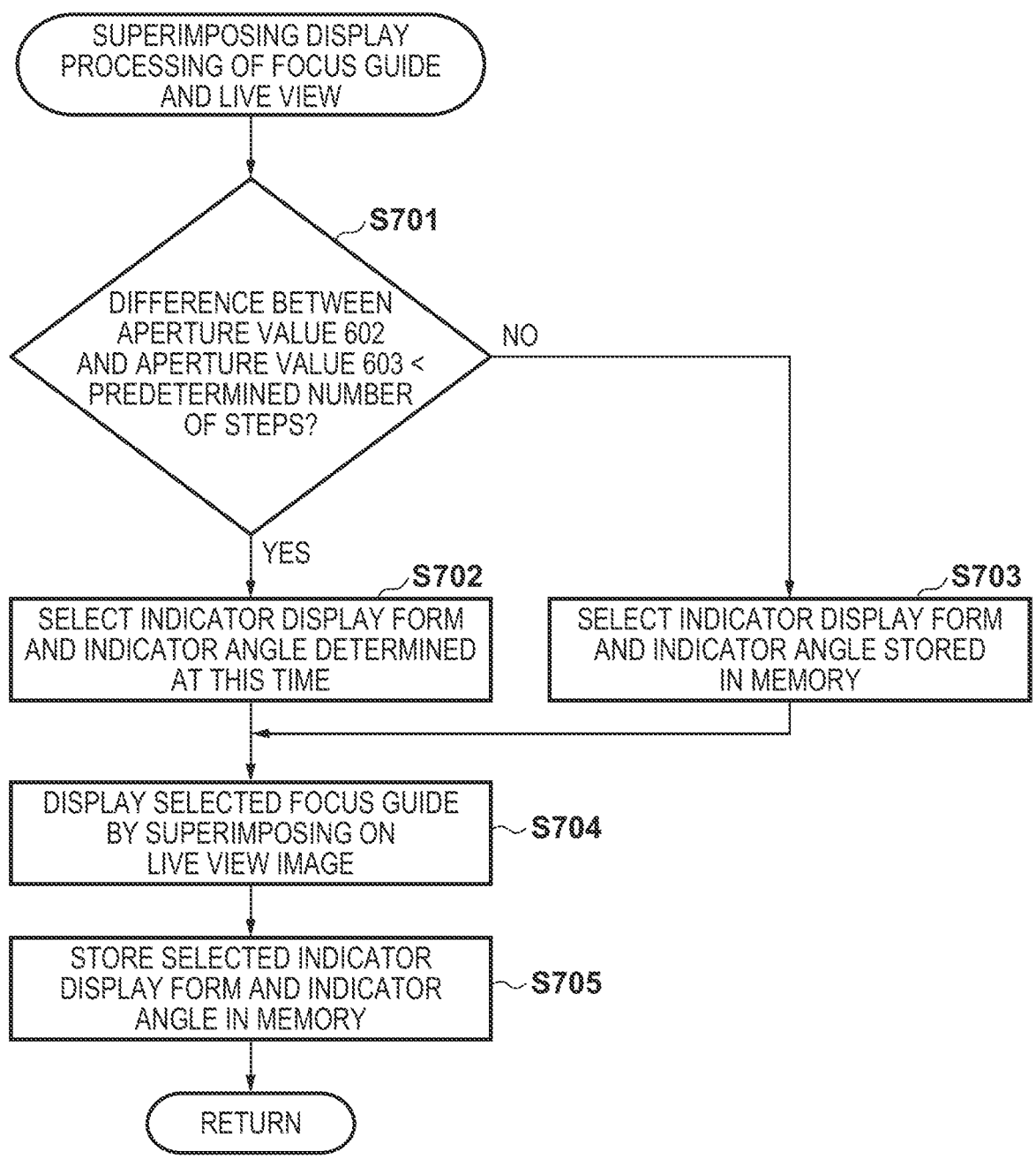
FIG. 7 is a flowchart showing superimposing display processing of a focus guide and a live view according to the first embodiment.

FIG. 7 is a flowchart showing the superimposing display processing of the focus guide and the live view in the first embodiment, and shows the details of the process in step S406 of FIG. 4. First, in step S701, the aperture value 602 on the lens communication obtained by communication with the lens unit 10, which has been acquired in step S401, is compared with the aperture value 603 to be used in the focus guide display processing. If the difference between the aperture value 602 and the aperture value 603 is less than the predetermined number of steps (less than a threshold value), the process proceeds to step S702, and if the difference is equal to or greater than the predetermined number of steps (equal to or greater than the threshold value), the process proceeds to step S703. Note that it may be determined in step S701 whether the aperture value 602 and the aperture value 603 match or not, and if they match, the process proceeds to step S702, and if they do not match, the process proceeds to step S703.

Figure 5:
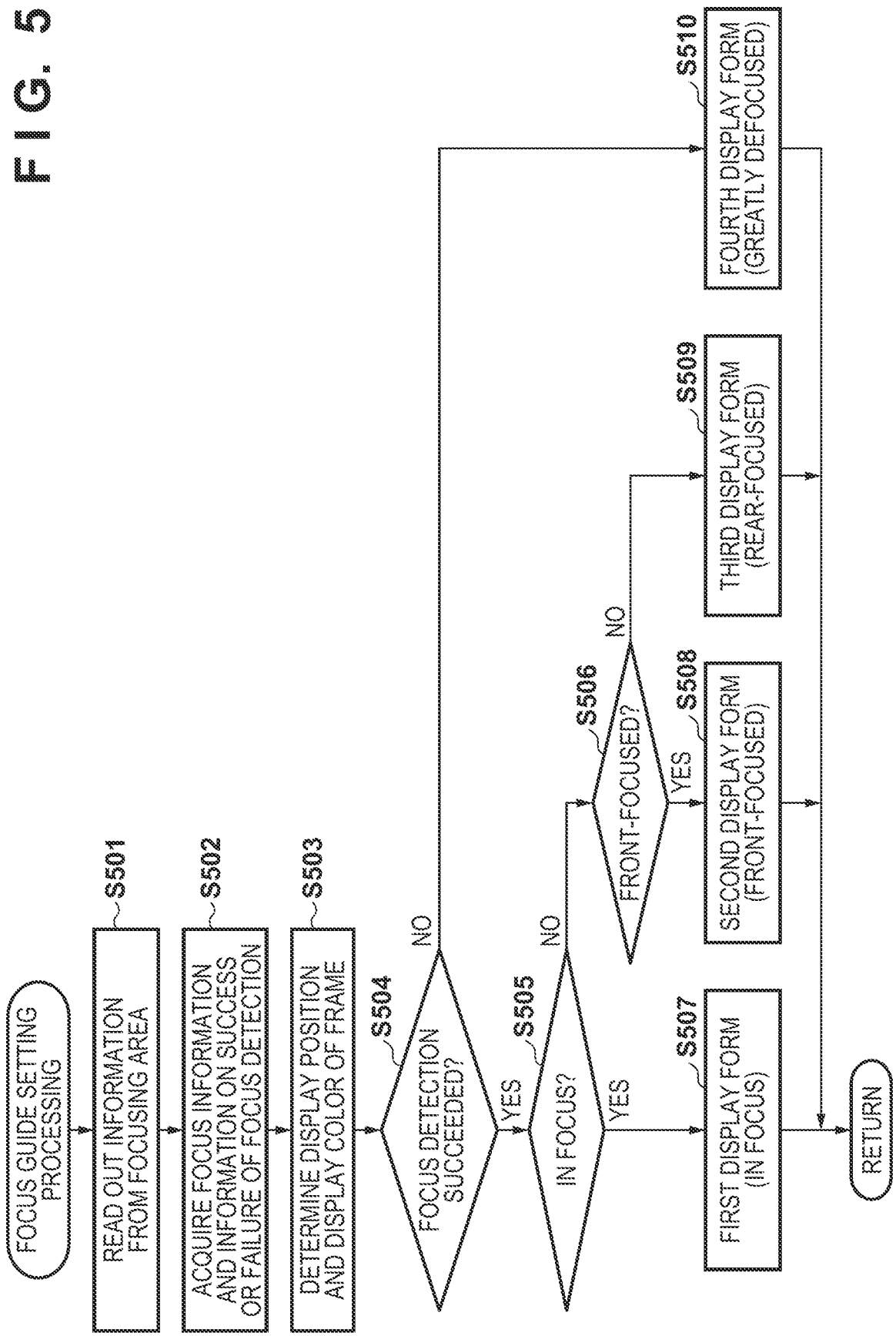
FIG. 5 is a flowchart of focus guide setting processing according to the embodiment.

In step S702, the indicator display form determined in any of steps S507 to S510 in FIG. 5 is selected, and the aperture value 603 is used to calculate the indicator angle from the defocus amount. On the other hand, in step S703, the previously used indicator display form and indicator angle stored in the memory by the process of step S705 described later are selected. Thereby, the indicator display form and the indicator angle which were used last time are maintained. As the memory, for example, an internal memory (not shown) of the camera control unit 207 may be used, or a memory (not shown) provided outside the camera control unit 207 may be used.

In step S704, the focus guide in the indicator display form selected in step S702 or S703 with the indicator angle is superimposed on the live view image on the display unit 205.

In step S705, the indicator display form selected in S702 or S703 and the indicator angle of the focus guide are stored in the memory. The indicator display form and the indicator angle stored in the memory are used in step S703 described above. When the above processing is completed, the process returns to the process of FIG. 4.

Here, FIG. 8A show an example of the display state of the focus guide when the processing of FIG. 7 is not performed and FIG. 8B show an example of the display state of the focus guide when the processing of FIG. 7 is performed. A summary of the display sates of each frame is shown in a table of FIG. 6B. In the table of FIG. 6B, the upper part shows the display states of the focus guide when the processing of FIG. 7 is not performed, and the lower part shows the display states of the focus guide when the processing of FIG. 7 is performed.

In a case where the processing of FIG. 7 is not performed, the indicator angle of the focus guide during the focus guide display processing is as shown by 801 in FIG. 8A before narrowing-down an aperture starts (up to frame 3), is as shown by 802 during narrowing-down the aperture (frames 4 to 6), and is as shown by 803 after narrowing-down the aperture (frames 7 and later). As shown in FIG. 8A, in the processes of narrowing down the aperture (from F2 to F16 in FIG. 6A), the indicator angle temporarily becomes small as shown by 802 and thus the display becomes unstable. Here, the reason why the indicator angle becomes the state as shown by 802 when the processing of FIG. 7 is not performed will be specifically described using frame 5 as an example. If the aperture value 602 at the start of the exposure of the frame 5 is f1, when processing the frame 5 in the focus guide display processing, the indicator angle is calculated using f1 as the aperture value 603. However, since the aperture is greatly narrowed down from f1 to f2 during the exposure of frame 5, the permissible circle of confusion Fδ gradually increases, and the defocus amount decreases if the focus lens is not moved. Therefore, when the indicator angle is calculated using f1, the angle becomes narrower than the proper angle.

On the other hand, when the processing of FIG. 7 is performed, the indicator angle of the focus guide is displayed as shown by 804 of FIG. 8B until the focus guide display processing is performed on the frame 1 by the control of step S702 based on the determination of step S701. Also, during the period when the focus guide display processing is performed on the frame 2 through the frame 6, a display is as shown by 805 due to the control of S703 based on the determination of step S701. The display shown by 805 is the same as the display shown by 804. Then, after the end of the narrowing-down, the display as shown by 806 is made by the control of step S702 based on the determination of step S701. As described above, since the display state (804) before the start of the narrowing-down can be maintained during the narrowing-down operation, the stability of the indicator angle of the focus guide can be improved during the transition of the aperture value. Although the state of the guide display is fixed even in the frame 2 and the like in which the guide display does not become inaccurate, the display quality is not affected so much.

According to the first embodiment as described above, the stability of the guide display indicating the focus state can be improved in the transition state of the aperture value.

Second Embodiment

Next, referring to FIG. 9, superimposing display processing of a focus guide and a live view in a second embodiment of the present invention will be described. The processing shown in FIG. 9 is the process executed in step S406 of FIG. 4 and is performed once every vertical synchronization period.

First, in step S901, the state of the narrowing-down operation of the diaphragm 102 is detected. Here, the state may be detected by acquiring a signal indicating whether the diaphragm 102 is being driven from the lens unit 10 or by comparing the current aperture value 602 with the one frame previous aperture value 602 acquired in step S401 of FIG. 4 and stored in the memory of the camera control unit 207. Next, in step S902, if the start of the narrowing-down is determined from the detection result of step S901, the process proceeds to step S903. If the start of the narrowing-down is not determined, that is, the narrowing-down is in progress or the narrowing-down is not performed, the process proceeds to step S904. The determination of the start of the narrowing-down may be made by determining, for example, whether or not the state in which the diaphragm 102 is currently driven is detected in step S901 and the state in which the diaphragm 102 was not driven is detected in step S901 in the previous routine. Further, in step S901, the start time of the narrowing-down of the diaphragm 102 may be acquired from the lens unit 10.

In step S903, the narrowing-down correspondence time indicating the time for performing display corresponding to the narrowing-down process of the diaphragm 102 since the narrowing-down has started is acquired. The narrowing-down correspondence time is a sum of the narrowing-down time needed for changing the aperture value of diaphragm 102 during exposure, and the time difference between when the exposure stars and when the focus guide display processing is performed (in the example shown in FIG. 6A, three vertical synchronization periods). Among these, the narrowing-down time depends on the lens type and the amount of change of the aperture value, and can be obtained by a known method, such as obtaining from a table prepared in advance in the camera body 20 or lens unit 10 or obtaining by calculation.

In step S904 it is determined whether the narrowing-down correspondence time acquired in step S903 has elapsed. Note that the determination here is made by comparing the narrowing-down correspondence time with an elapsed time since the start time of the narrowing-down if the start time has been acquired in step S901, or since the start time of a frame in which the start of the narrowing-down has determined if the start time of the narrowing-down has not been acquired. If the narrowing-down correspondence time has elapsed, the process advances to step S702; if it has not elapsed, the process advances to step S703. In a case where the narrowing-down is not performed, if narrowing-down has been performed even once in the past, it may be determined whether the narrowing-down correspondence time has elapsed, but if the narrowing-down has not been performed even once in the past, it is determined that the narrowing-down correspondence time has elapsed.

In step S702, the indicator display form and the indicator angle determined this time are selected as those to be displayed, and the focus guide display is updated. On the other hand, in step S703, since the narrowing-down correspondence time has not yet passed, the indicator display form and indicator angle stored in the memory are selected as those to be displayed, and the previous focus guide display is maintained by selecting the indicator display form and indicator angle used last time. Thus, the same focus guide display continues to be displayed during the transition of the aperture state of the diaphragm 102 at the time of exposure and during the transition of the aperture state of the diaphragm 102 at the time of focus processing.

As the processes subsequent to step S702 is the same as the processes subsequent to step S702 of FIG. 7 in the first embodiment, description thereof is omitted.

By performing the display processing shown in FIG. 9, step S702 is selected before narrowing down the aperture and the indicator angle of the focus guide is displayed as shown by 804 in FIG. 8B, step S703 is selected while narrowing down the aperture and the indicator angle of the focus guide is displayed as shown by 805, and S702 is selected after narrowing down the aperture and the indicator angle of the focus guide is displayed as shown by 806.

According to the second embodiment as described above, as in the first embodiment, stable focus guide display can be performed while narrowing down the aperture.

Note that the embodiment of the present invention has been described a case where the user operates the narrowing-down button. If the processing of FIG. 7 is not performed when the narrowing-down button is released, the indicator angle temporarily becomes large in the process of transition since the start of end operation of the narrowing-down to the end of the end operation of the narrowing-down, and the display becomes unstable. On the other hand, if the processing of FIG. 7 is performed, the display state used before the start of the end operation of the narrowing-down (806 in FIG. 8B) is maintained while the end operation of the narrowing-down is performed. Therefore, the stability of the indicator angle of the focus guide is improved during the transition of the aperture. In this way, stable focus guide display can be performed while the end operation of the narrowing-down is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125295, filed on Jun. 29, 2018 which is hereby incorporated by reference herein in its entirety.

What is claimed is:

1. An image capturing apparatus comprising:
   an image sensor that periodically outputs an image obtained by converting light entering through a diaphragm into an image signal; and
   one or more processors and/or circuitry which functions as:
   an acquisition unit that periodically acquires an aperture state of the diaphragm;
   a generator that generates a first indicator indicating a focus state of the image based on a value obtained by normalizing the focus state of the image based on the aperture state of the diaphragm at a time of exposure of the image;
   a controller that superimposes the image and an indicator indicating a focus state of the image, and displays a resultant image on a display device;
   a memory that stores the indicator displayed on the display device as a second indicator; and
   a selector that selects the first indicator in a case where the aperture state of the diaphragm at least at the time of exposure of the image or at a time of generating the first indicator by the generator is not changing, and selects the second indicator in a case where the aperture state at these times is changing, wherein the controller displays the indicator selected by the selector.

2. The image capturing apparatus according to claim 1, wherein the selector selects the first indicator in a case where a difference between the aperture state of the diaphragm at the time of exposure of the image and the aperture state of the diaphragm obtained at the time of generating the first indicator by the generator is less than a predetermined threshold, and selects the second indicator in a case where the difference is equal to or greater than the threshold.

3. The image capturing apparatus according to claim 1, wherein the selector selects the first indicator in a case where the aperture state of the diaphragm at the time of exposure of the image and the aperture state of the diaphragm obtained at the time of generating the first indicator by the generator match, and selects the second indicator in a case where these aperture states do not match.

4. The image capturing apparatus according to claim 1, further comprising one or more processors and/or circuitry which functions as a designator used for designating an aperture value of the diaphragm, wherein the selector selects the second indicator during an added period of a period since the aperture state of the diaphragm at the time of exposure of the image starts to change until the aperture state reaches the aperture value and a period required for generating the first indicator by the generator after the exposure of the image ends, and selects the first indicator during a period except for the added period.

5. The image capturing apparatus according to claim 1, wherein the acquisition unit acquires the aperture state of the diaphragm at a same period as an exposure period of the image.

6. The image capturing apparatus according to claim 5, wherein the acquisition unit acquires the aperture state of the diaphragm at a time of starting exposure of the image.

7. The image capturing apparatus according to claim 1, wherein the generator normalizes the focus state based on a size of a permissible circle of confusion corresponding to the aperture state of the diaphragm.

8. The image capturing apparatus according to claim 7, wherein the indicator includes two display parts that move along an arc for indicating a focus state, and, if the aperture state of the diaphragm is same, an angle made by the two display parts becomes larger as the focus state is more defocused.

9. The image capturing apparatus according to claim 8, wherein, if the focus state is the same, the angle becomes smaller as the permissible circle of confusion becomes larger.

10. The image capturing apparatus according to claim 7, wherein the indicator includes two display parts for indicating a focus state, and, if the aperture state of the diaphragm is same, the distance between the two display parts becomes larger as the focus state is more defocused.

11. The image capturing apparatus according to claim 10, wherein, if the focus state is the same, the distance becomes shorter as the permissible circle of confusion becomes larger.

12. A control method of an image capturing apparatus comprising:

an image sensor periodically outputting an image obtained by converting light entering through a diaphragm into an image signal;

periodically acquiring an aperture state of the diaphragm;

generating a first indicator indicating a focus state of the image based on a value obtained by normalizing the focus state of the image based on the aperture state of the diaphragm at a time of exposure of the image;

superimposing the image and an indicator indicating a focus state of the image, and displaying a resultant image on a display device;

storing the indicator displayed on the display device as a second indicator in a memory; and selecting the first indicator in a case where the aperture state of the diaphragm at least at the time of exposure of the image or at a time of generating the first indicator is not changing, and selects the second indicator in a case where the aperture state at these times is changing, wherein the selected indicator is displayed on the display device.

* * * * *